UNITED STATES PATENT OFFICE.

CASSIUS M. RICHMOND, OF NEW YORK, N. Y.

PREPARING AND TREATING TEETH.

SPECIFICATION forming part of Letters Patent No. 277,935, dated May 22, 1883.

Application filed February 9, 1883. (No model.)

*To all whom it may concern:*

Be it known that I, CASSIUS M. RICHMOND, of the city, county, and State of New York, have invented certain Improvements in Preparing and Treating Teeth, of which the following is a specification.

The object of this invention is to operate without pain to the patient upon the roots of teeth, specially upon those which are to be used as supports for artificial dentures, as set forth in other applications which I have filed for Letters Patent; and my invention consists in isolating the tooth and employing a freezing process, as hereinafter described.

In order to secure proper supports for the artificial dentures before referred to, it is often necessary to remove the crown from a tooth in which the nerve is still alive, or to cut down a root to a level with the gum—an operation which by ordinary modes of treatment is exceedingly painful. I effect such operation without pain by subjecting the teeth to a freezing process similar to that used in freezing gums. I first isolate the tooth to be operated upon by a rubber dam, so that injury to adjacent teeth by freezing the same is prevented. I then throw a jet or spray of ether or other volatile liquid directly upon the tooth until the nerve therein is frozen. The tooth may then be cut or drilled, the nerve extracted, and such other operations as are requisite be performed without pain to the patient. The root may be then plugged in any desired manner.

In some instances where it is necessary to operate upon a tooth without removing the crown the same mode of treatment may be employed, the nerve being frozen and then extracted.

I am aware of the use of a spray of volatile liquid for the purpose of benumbing the flesh prior to operating directly upon the same, and that freezing-mixtures have been applied to teeth; but I am not aware that means have ever been used whereby to prevent injury to adjacent teeth by localizing those operated upon.

I claim—

The process of treating teeth to remove the nerves, the same consisting in isolating the tooth to be treated, and then subjecting the latter to the action of a jet of volatile liquid until the nerve within the same is benumbed, substantially as set forth.

In testimony whereof I have signed my name to this specification in the presence of two subscribing witnesses.

CASSIUS M. RICHMOND.

Witnesses:
GEO. H. EVANS,
CHARLES E. FOSTER.